US012684025B2

(12) United States Patent
Bouazizi et al.

(10) Patent No.: US 12,684,025 B2
(45) Date of Patent: Jul. 14, 2026

(54) BACKWARD-COMPATIBLE 3D MESSAGING

(71) Applicant: QUALCOMM Incorporated, San Diego, CA (US)

(72) Inventors: Imed Bouazizi, Celina, TX (US); Liangping Ma, San Diego, CA (US); Thomas Stockhammer, Bergen (DE); Nikolai Konrad Leung, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 34 days.

(21) Appl. No.: 18/784,524

(22) Filed: Jul. 25, 2024

(65) Prior Publication Data

US 2025/0039251 A1    Jan. 30, 2025

Related U.S. Application Data

(60) Provisional application No. 63/516,328, filed on Jul. 28, 2023.

(51) Int. Cl.
| | |
|---|---|
| *H04L 65/1089* | (2022.01) |
| *H04L 51/063* | (2022.01) |
| *H04N 19/40* | (2014.01) |

(52) U.S. Cl.
CPC ........ *H04L 65/1089* (2013.01); *H04L 51/063* (2013.01); *H04N 19/40* (2014.11); *G06T 2200/16* (2013.01)

(58) Field of Classification Search
CPC ... H04L 65/1089; H04L 51/063; H04L 51/06; H04L 51/066; H04L 65/756;
(Continued)

(56) References Cited

U.S. PATENT DOCUMENTS

| | | | |
|---|---|---|---|
| 2008/0141175 A1* | 6/2008 | Sarna ...................... | H04L 67/00 |
| | | | 715/848 |
| 2012/0311463 A1* | 12/2012 | Hickman ................ | G06T 19/00 |
| | | | 715/757 |

(Continued)

OTHER PUBLICATIONS

3GPP : "3rd Generation Partnership Project, Technical Specification Group Services and System Aspects, Messaging Media Profiles, (Release 18)", 3GPP TS 26.143 V18.0.0, Mar. 2024, 30 Pages.
(Continued)

*Primary Examiner* — Johnny B Aguiar
(74) *Attorney, Agent, or Firm* — Shumaker & Sieffert, P.A.

(57) ABSTRACT

An example server device for sending media data includes a memory configured to store media data; and a processing system implemented in circuitry and configured to: receive a set of three-dimensional (3D) media data being sent to a client device; transcode the set of 3D media data to a set of one or more images; and send the set of one or more images to the client device. The server device may receive a message from a source client device destined for the client device, where the message includes the 3D media data. The message may be a Multimedia Message Service (MMS) message including the 3D media data. The client device may initially provide data representing rendering capabilities of the client device to the server device, such that the server device may determine that the client device is not capable of rendering the 3D media data.

17 Claims, 5 Drawing Sheets

(58) Field of Classification Search
CPC .. H04L 65/765; H04N 19/40; H04N 21/2343;
H04N 21/25825; H04N 21/4788; H04N
21/816; H04N 21/85406; H04N 13/139;
G06T 2200/16
See application file for complete search history.

(56) References Cited

U.S. PATENT DOCUMENTS

| | | | | |
|---|---|---|---|---|
| 2015/0154798 | A1* | 6/2015 | Simpson | G06T 19/003 |
| | | | | 345/419 |
| 2015/0163476 | A1* | 6/2015 | Grafulla-Gonzalez | |
| | | | | H04N 13/172 |
| | | | | 348/43 |
| 2015/0201179 | A1* | 7/2015 | Bouazizi | H04W 8/24 |
| | | | | 348/43 |
| 2017/0353709 | A1* | 12/2017 | Oyman | H04L 5/0051 |
| 2019/0313081 | A1* | 10/2019 | Oh | H04N 21/235 |
| 2021/0074062 | A1* | 3/2021 | Madonna | G05B 15/02 |
| 2023/0343048 | A1* | 10/2023 | Besecker | G06Q 30/0276 |
| 2024/0020921 | A1* | 1/2024 | Rokutan | G06T 17/00 |

OTHER PUBLICATIONS

3GPP: "3rd Generation Partnership Project, Technical Specification Group Services and System Aspects, Multimedia Messaging Service (MMS), Media Formats and Codecs (Release 18)", 3GPP TS 26.140 V18.0.0, Mar. 2024, 15 Pages.

3GPP TR 26.905: "3rd Generation Partnership Project, Technical Specification Group Services and System Aspects, Mobile Stereoscopic 3D Video (Release 15)", 3gpp Draft, 26905-F00, 3rd Generation Partnership Project, Mobile Competence Centre, 650, Route Des Lucioles, F-06921 Sophia-Antipolis Cedex, France, 3GPP TR 26.905, V15.0.0, Jun. 22, 2018, pp. 1-56.

Bouazizi I (QUALCOMM INC)., et al., "CR on Corrections and Transcoding Guidelines", 3GPP TSG-S4 Meeting # 128, S4-240926, TYPE CR, CR 0002, Promise, 3rd Generation Partnership Project, Mobile Competence Centre, 650, Route Des Lucioles, F-06921 Sophia-Antipolis Cedex, France, vol. 3GPP SA 4, No. Jeju, KR, May 20, 2024-May 24, 2024, May 14, 2024, 5 Pages.

Bouazizi I (QUALCOMM INC)., et al., "[PROMISE] On Support for 3D Formats in Messaging", TSG SA4 SWG #125 Meeting, S4-231183, Type Discussion, 3rd Generation Partnership Project, Mobile Competence Centre, 650, Route Des Lucioles, F-06921 Sophia-Antipolis Cedex, France, vol. 3GPP SA 4, No. Goteborg, SE, Aug. 21, 2023-Aug. 25, 2023, Aug. 15, 2023, 4 Pages.

International Search Report and Written Opinion—PCT/US2024/039735—ISA/EPO—Oct. 2, 2024.

ISO/IEC: "Information Technology—Runtime 3D Asset Delivery Format—Khronos glTF(TM) 2.0", ISO/IEC 12113:2022, IEC, 3, Rue De Varembe, PO Box 131, CH-1211 Geneva 20, Switzerland, Jul. 26, 2022, 202 Pages.

* cited by examiner

RECEIVE RENDERING
CAPABILITY DATA FROM
CLIENT DEVICE
~250

RECEIVE MESSAGE INCLUDING
3D MEDIA DATA FROM SOURCE
CLIENT DEVICE
~252

TRANSCODE 3D MEDIA DATA
TO IMAGE DATA
~254

SEND IMAGE DATA
TO CLIENT DEVICE
~256

BACKWARD-COMPATIBLE 3D MESSAGING

This application claims the benefit of U.S. Provisional Application No. 63/516,328, filed Jul. 28, 2023, the entire contents of which are hereby incorporated by reference.

TECHNICAL FIELD

This disclosure relates to transport of encoded 3D media data.

BACKGROUND

Media data may be packetized for transmission or storage. The media data may be assembled into a media file conforming to any of a variety of standards, such as the International Organization for Standardization (ISO) base media file format and extensions thereof, such as Advanced Video Coding (AVC).

SUMMARY

In general, this disclosure describes techniques for transcoding three-dimensional (3D) media data to two-dimensional (2D) image data, to support backward compatibility for devices that do not support rendering of 3D media data. That is, 3D media data may be exchanged in, e.g., a Multimedia Messaging Service (MMS) message. Many devices are not capable of processing 3D media data as part of an MMS message, but are capable of processing 2D image data (e.g., a single image, an image sequence such as a Graphics Interchange Format (GIF), or a video sequence) as part of an MMS message. Thus, according to the techniques of this disclosure, a server device (e.g., a multimedia messaging server) may transcode 3D media data of an MMS message to an image or image sequence, then send the transcoded MMS message to a device that is not capable of rendering 3D media data of an MMS message.

In one example, a method of sending media data includes: receiving, by a server device, a set of three-dimensional (3D) media data being sent to a client device; transcoding, by the server device, the set of 3D media data to a set of one or more images; and sending, by the server device, the set of one or more images to the client device.

In another example, a server device for sending media data includes: a memory configured to store media data; and a processing system implemented in circuitry and configured to: receive a set of three-dimensional (3D) media data being sent to a client device; transcode the set of 3D media data to a set of one or more images; and send the set of one or more images to the client device.

In another example, a server device for sending media data includes: means for receiving a set of three-dimensional (3D) media data being sent to a client device; means for transcoding the set of 3D media data to a set of one or more images; and means for sending the set of one or more images to the client device.

In another example, a computer-readable storage medium has stored thereon instructions that, when executed, cause a processor of a server device to: receive a set of three-dimensional (3D) media data being sent to a client device; transcode the set of 3D media data to a set of one or more images; and send the set of one or more images to the client device.

The details of one or more examples are set forth in the accompanying drawings and the description below. Other features, objects, and advantages will be apparent from the description and drawings, and from the claims.

DETAILED DESCRIPTION

Figure 1:
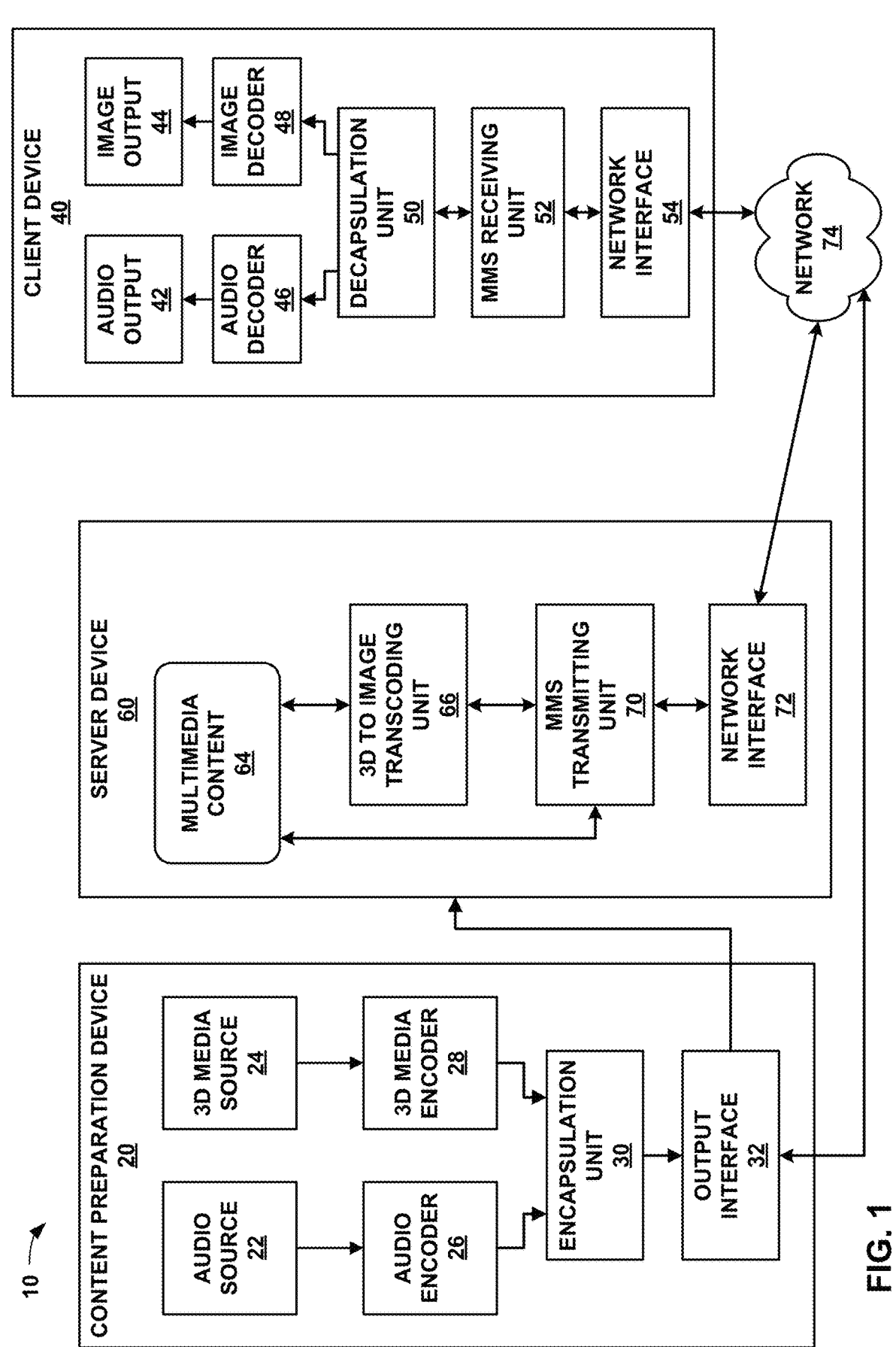
FIG. 1 is a block diagram illustrating an example system that implements techniques for streaming media data over a network.

In general, this disclosure describes techniques related to exchanging three-dimensional (3D) media data between two devices when one of the two devices is not capable of rendering the 3D media data. The 3D media data may be, for example, augmented reality (AR), virtual reality (VR), mixed reality (MR), or other such extended reality (XR) data, or exchanged as part of an AR, VR, MR, or XR session, e.g., via Multimedia Messaging Service (MMS). In the description below, XR is generally discussed, and AR, VR, and MR represent examples of XR.

In some cases, a user with an XR-capable device, e.g., a cellular phone, smart phone, tablet, or the like, may wish to send a 3D representation of an object to another user with a device that is not XR-capable. For example, the two users may be planning to purchase a new piece of furniture and wish to see how the furniture looks in an existing space. Thus, one of the users may find a new piece of furniture and capture an image of the furniture, and their device may translate the image to a 3D representation, such that the other device can render a virtual representation of the furniture in an image of the existing space.

However, when the other device is not capable of rendering the 3D representation, according to the techniques of this disclosure, an intermediate device, such as an edge server of, e.g., a fifth generation (5G) or other radio access network (RAN), may transcode the 3D representation to an image or series of images. In some cases, the edge server may determine that the other device is not capable of rendering the 3D representation. As such, in response to receiving the 3D representation, e.g., in an MMS message or via a Real-time Transport Protocol (RTP) session, the edge server may transcode the 3D representation to an image or series of images (e.g., a GIF or a set of video data) that can be processed by the other device. The edge server may then send the transcoded data (2D media data) to the other device.

In some examples, the receiving device may request a particular movement of a virtual camera along a camera path, e.g., pitch, yaw, roll, and/or movement along the X-, Y-, and/or Z-dimensions. In some examples, the edge server may be configured with a predefined set of virtual camera movements for the camera path. In either case, the edge server may move the virtual camera along the camera path and capture images along the camera path, e.g., at a predefined set of positions along the path or at a particular frame rate, e.g., 30 fps, 60 fps, 120 fps, or the like.

The communication session between the two devices may be, for example, an RTP session, a multimedia message sent according to Multimedia Messaging Service (MMS), an XR session, or other communication session.

In this manner, the techniques of this disclosure may be used to provide 3D object data to a device that is not capable of rendering 3D object data. Thus, the device may engage in a messaging session with another device and be capable of receiving 3D object data from the other device as part of the messaging session, even without being capable of locally rendering the 3D object data. Thus, these techniques allow backwards compatibility of 3D object data messaging with devices that are not capable of rendering the 3D object data.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled.

Content preparation device 20 represents a device that captures and prepares media data to be sent to client device 40. Client device 40, in turn, represents a device that receives the media data and presents the media data to a user of client device 40. In some examples, content preparation device 20 may also include the components shown in client device 40, and likewise, client device 40 may include the components shown in content preparation device 20. For example, content preparation device 20 and client device 40 may each represent respective user equipment (UE) devices, e.g., cellphones, tablets, or other communication devices. Content preparation device 20 and client device 40 may participate in a two-way communication session, which may include exchange of audio, video, image, and/or three-dimensional (3D) media data.

In some cases, a device, such as client device 40, may not be capable of receiving and processing 3D media data received via a certain communication protocol, such as Multimedia Messaging Service (MMS). For example, content preparation device 20 may be configured to capture 3D media data, which may be a 3D object to be rendered by a destination device. That is, the 3D media data may generally represent a set of vertices and edges defining a shape of the 3D object and various characteristics representing how to present the 3D object (e.g., color, reflectivity, and other such information). Client device 40 may not be capable of rendering the 3D media data.

According to the techniques of this disclosure, server device 60, positioned between content preparation device 20 and client device 40, may be configured to receive the 3D media data from content preparation device 20 and transcode the 3D media data to a set of image data. The image data may include a static image, a series of images (e.g., as a GIF), or video data. In some examples, server device 60 may render a video or image sequence according to a predefined virtual camera movement about the 3D object. In some examples, client device 40 may request one or more movements of the virtual camera, and server device 60 may generate and send image or video data according to the requested movements of the virtual camera by client device 40.

Content preparation device 20, in the example of FIG. 1, includes audio source 22 and 3D media source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. 3D media source 24 may comprise a still image or video camera that captures one or more images to be used to produce 3D media data to be encoded by 3D media encoder 28, a storage medium encoded with previously recorded 3D media data, a 3D media data generation unit such as a computer graphics source or game engine, or any other source of 3D media data.

Raw data may comprise analog or digital data. Analog data may be digitized before being encoded by audio encoder 26 and/or 3D media encoder 28. Audio source 22 may obtain audio data from a speaking participant while the speaking participant is speaking, and 3D media source 24 may simultaneously obtain 3D media data of the speaking participant. In other examples, audio source 22 may comprise a computer-readable storage medium comprising stored audio data, and 3D media source 24 may comprise a computer-readable storage medium comprising stored 3D media data. In this manner, the techniques described in this disclosure may be applied to live, streaming, real-time audio and 3D media data or to archived, pre-recorded audio and 3D media data.

Audio frames that correspond to 3D media frames are generally audio frames containing audio data that was captured (or generated) by audio source 22 contemporaneously with 3D media data captured (or generated) by 3D media source 24 that is contained within the 3D media frames. For example, while a speaking participant generally produces audio data by speaking, audio source 22 captures the audio data, and 3D media source 24 captures 3D media data of the speaking participant at the same time, that is, while audio source 22 is capturing the audio data. Hence, an audio frame may temporally correspond to one or more particular 3D media frames. Accordingly, an audio frame corresponding to a 3D media frame generally corresponds to a situation in which audio data and 3D media data were captured at the same time and for which an audio frame and a 3D media frame comprise, respectively, the audio data and the 3D media data that was captured at the same time.

In some examples, audio encoder 26 may encode a timestamp in each encoded audio frame that represents a time at which the audio data for the encoded audio frame was recorded, and similarly, 3D media encoder 28 may encode a timestamp in each encoded 3D media frame that represents a time at which the 3D media data for an encoded 3D media frame was recorded. In such examples, an audio frame corresponding to a 3D media frame may comprise an audio frame comprising a timestamp and a 3D media frame comprising the same timestamp. Content preparation device 20 may include an internal clock from which audio encoder 26 and/or 3D media encoder 28 may generate the timestamps, or that audio source 22 and 3D media source 24 may use to associate audio and 3D media data, respectively, with a timestamp.

In some examples, audio source 22 may send data to audio encoder 26 corresponding to a time at which audio data was recorded, and 3D media source 24 may send data to 3D media encoder 28 corresponding to a time at which 3D media data was recorded. In some examples, audio encoder 26 may encode a sequence identifier in encoded audio data to indicate a relative temporal ordering of encoded audio data but without necessarily indicating an absolute time at which the audio data was recorded, and similarly, 3D media encoder 28 may also use sequence identifiers to indicate a relative temporal ordering of encoded 3D media data. Similarly, in some examples, a sequence identifier may be mapped or otherwise correlated with a timestamp.

Audio encoder 26 generally produces a stream of encoded audio data, while 3D media encoder 28 produces a stream of encoded 3D media data. Each individual stream of data (whether audio or 3D media) may be referred to as an elementary stream. An elementary stream is a single, digitally coded (possibly compressed) component of a media presentation. For example, the coded 3D media or audio part of the media presentation can be an elementary stream. An elementary stream may be converted into a packetized elementary stream (PES) before being encapsulated within a 3D media file. Within the same media presentation, a stream ID may be used to distinguish the PES-packets belonging to one elementary stream from the other. The basic unit of data of an elementary stream is a packetized elementary stream (PES) packet. Thus, coded 3D media data generally corresponds to elementary 3D media streams. Similarly, audio data corresponds to one or more respective elementary streams.

In the example of FIG. 1, encapsulation unit 30 of content preparation device 20 receives elementary streams comprising coded 3D media data from 3D media encoder 28 and elementary streams comprising coded audio data from audio encoder 26. In some examples, 3D media encoder 28 and audio encoder 26 may each include packetizers for forming PES packets from encoded data. In other examples, 3D media encoder 28 and audio encoder 26 may each interface with respective packetizers for forming PES packets from encoded data. In still other examples, encapsulation unit 30 may include packetizers for forming PES packets from encoded audio and 3D media data.

3D media encoder 28 may encode 3D media data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics.

Server device 60 includes 3D to image transcoding unit 66, Multimedia Messaging Service (MMS) transmitting unit 70, and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

According to the techniques of this disclosure, server device 60 may receive data from client device 40 indicating rendering capabilities of client device 40 for multimedia messages, e.g., according to RTP, MMS, or the like. For example, client device 40 may indicate to server device 60 that client device 40 is not capable of rendering 3D media data.

Accordingly, when server device 60 receives multimedia content 64 including 3D media data, 3D to image transcoding unit 66 may transcode the 3D media data to a set of one or more images, e.g., a single image, a series of images, a Graphics Interchange Format (GIF), video data, or the like. Server device 60 may generate the image or image sequence as a High Efficiency Image File (HEIF) encoded image sequence, an animated GIF, or the like. In some examples, server device 60 may form an alpha channel/image associated with each rendered image, to enable emulation of an augmented reality (AR) experience. That is, client device 40 may present the image sequence over a background image or image sequence captured by client device 40, such that the alpha channel portion does not obstruct the background image or image sequence.

In some examples, content preparation device 20 or client device 40 may provide a requested or recommended camera path along which images of the 3D media data should be rendered to generate the image sequence. The camera path may include an initial pose and a set of additional poses and time samples, where each pose/time sample pair provides the pose of the camera and a time offset at which this pose should be activated. Alternatively, the camera path may include the initial pose and a description of a path for the camera, including the shape of each segment of the path and the velocity of the camera movement. In some examples, server device 60 may select from a pre-configured set of camera paths for rendering the image sequence.

MMS transmitting unit 70 is configured to deliver media data to client device 40 via network 74 according to MMS. In other examples, MMS transmitting unit 70 may additionally or alternatively implement protocols such as, for example, Real-time Transport Protocol (RTP), RTP Control Protocol (RTCP), Real-time Streaming Protocol (RTSP), Session Initiation Protocol (SIP), and/or Session Description Protocol (SDP). MMS transmitting unit 70 may send media data via network interface 72.

MMS transmitting unit 70 of server device 60 may send media data (e.g., packets of media data) to client device 40 according to MMS. Server device 60 and client device 40 may exchange control data indicating, for example, reception statistics by client device 40, such that server device 60 can perform congestion control or otherwise diagnose and address transmission faults.

Server device 60 may receive a multimedia message from content preparation device 20, where the multimedia message is formatted as a multi-part Multipurpose Internet Mail Extensions (MIME) message. A first part of the message to contain a Graphics Library Transmission Format (glTF) file or a Graphics Library Transmission Format Binary (glB) file including the image data. Another part of the message may contain recommended camera information. Alternatively, the recommended camera information may be included as part of the glTF file, e.g., as an animation element. 3D to image transcoding unit 66 may form a transcoded message from the received message including one MIME part that indicates an image/image sequence.

In this manner, server device 60 may implement techniques to add support for 3D content in multimedia messaging and to address devices that do not support 3D content in multimedia messages. The 3D content may be rendered by server device 60, which may be a multimedia server, such that server device 60 may transcode the 3D content to an image or image sequence, which is supported by client device 40.

Network interface 54 may receive and provide media of a selected media presentation to MMS receiving unit 52, which may in turn provide the media data to decapsulation unit 50. Decapsulation unit 50 may decapsulate elements of a 3D media file into constituent components to retrieve encoded data, and send the encoded data to either audio decoder 46 or image decoder 48. Audio decoder 46 decodes encoded audio data and sends the decoded audio data to audio output 42, while image decoder 48 decodes encoded image data and sends the decoded image data, which may include a still image, a series of images (e.g., a GIF file), and/or video data, to image output 44.

3D media encoder 28, image decoder 48, audio encoder 26, audio decoder 46, encapsulation unit 30, MMS receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of 3D media encoder 28 and image decoder 48 may be included in one or more encoders or decoders, either of which may be integrated as part of a combined media encoder/decoder (CODEC). Likewise, each of audio encoder 26 and audio decoder 46 may be included in one or more encoders or decoders, either of which may be integrated as part of a combined CODEC. An apparatus including 3D media encoder 28, image decoder 48, audio encoder 26, audio decoder 46, encapsulation unit 30, MMS receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form Network Abstraction Layer (NAL) units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of packetized elementary stream (PES) packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio, 3D media, and/or video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

Figure 2:
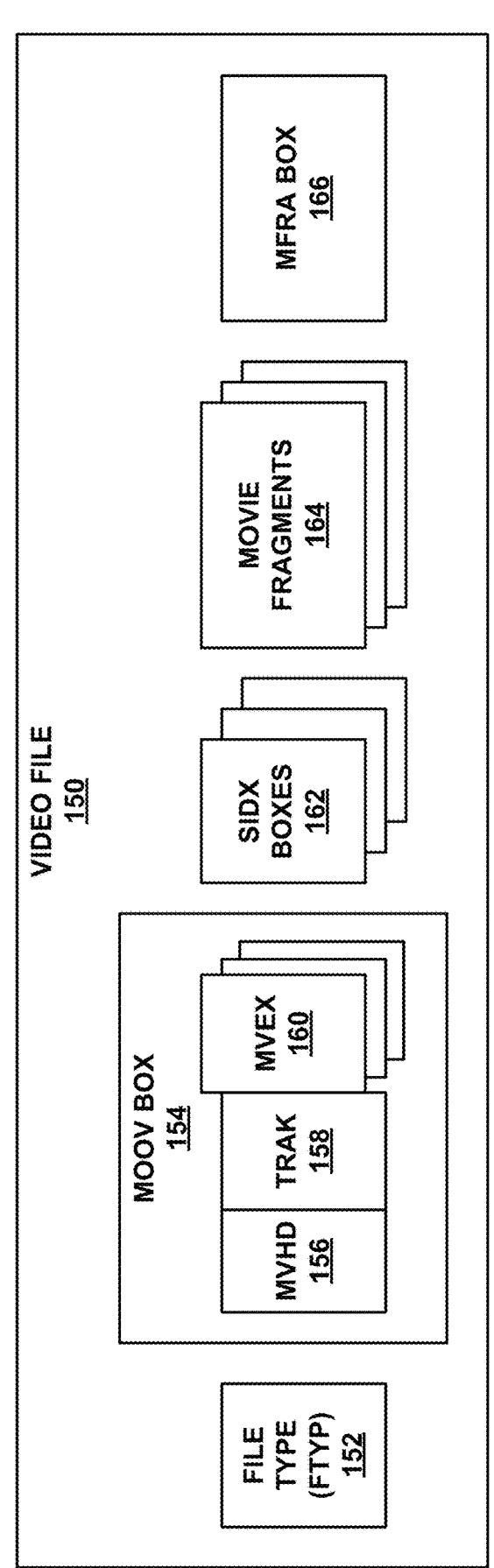
FIG. 2 is a block diagram illustrating elements of an example video file.

FIG. 2 is a block diagram illustrating elements of an example video file 150. Video file 150 may be included in a message sent according to a messaging service, such as Multimedia Message Service (MMS). Thus, video file 150 may be included in an MMS message. Additionally or alternatively, video file 150 may be included in one or more multimedia messaging body parts (MMBPs) of a multimedia message, which may be an MMS message or other messaging protocol message.

As described above, video files in accordance with the ISO base media file format and extensions thereof store data in a series of objects, referred to as "boxes." In the example of FIG. 2, video file 150 includes file type (FTYP) box 152, movie (MOOV) box 154, segment index (sidx) boxes 162, movie fragment (MOOF) boxes 164, and movie fragment random access (MFRA) box 166. Although FIG. 2 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 2, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of Advanced Video Coding (AVC), the coded picture include one or more video coding layer (VCL) NAL units, which contain the information to construct all the pixels of the access unit and other associated non-VCL NAL units, such as Supplemental Enhancement Information (SEI) messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the Third Generation Partnership Project (3GPP) file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub) segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 2). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 3:
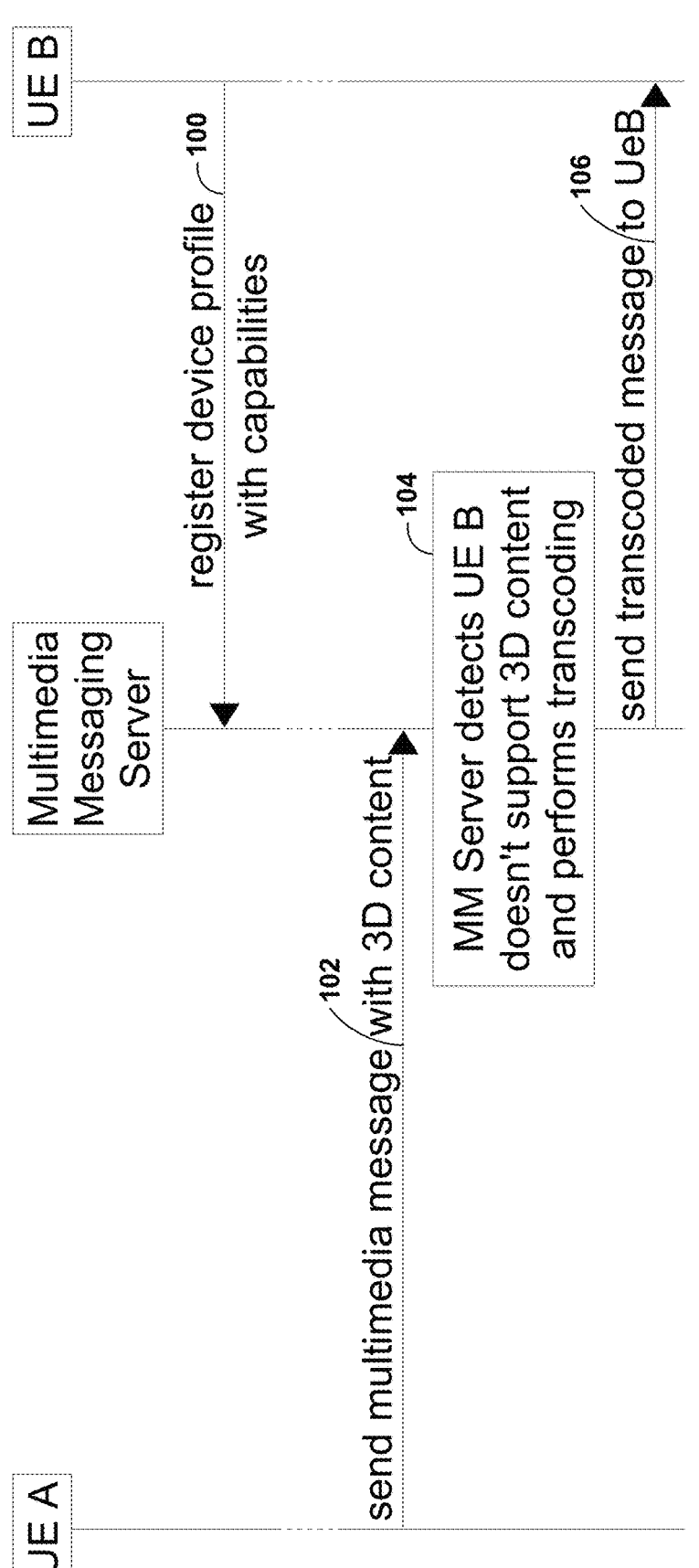
FIG. 3 is a flowchart illustrating an example method of transcoding 3D media data according to the techniques of this disclosure.

FIG. 3 is a flowchart illustrating an example method of transcoding 3D media data according to the techniques of this disclosure. In the example of FIG. 3, UE A may correspond to content preparation device 20 of FIG. 1, multimedia messaging server may correspond to server device 60 of FIG. 1, and UE B may correspond to client device 40 of FIG. 1.

Initially, UE B may register a device profile with capabilities of UE B with the multimedia messaging server (100). UE A may then send a multimedia message with 3D content (102). The multimedia messaging server may detect that UE B does not support 3D content, and thus, performs transcoding (104). For example, the multimedia messaging server may render the 3D media data into one or more images, and then encode the one or more images. The encoded images may be an HEIF-formatted encoded image sequence. The multimedia messaging server may then send the transcoded message to UE B (106).

Figure 4:
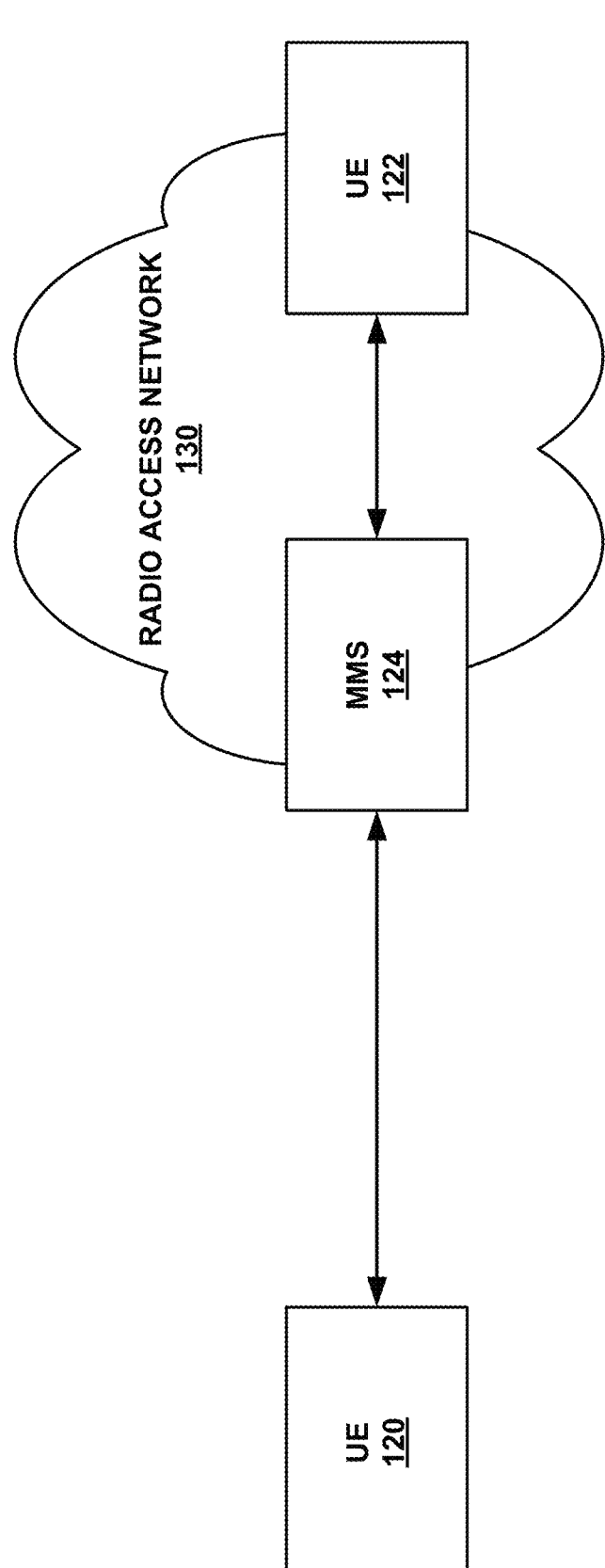
FIG. 4 is a block diagram illustrating an example set of devices that may exchange messages including 3D media data according to techniques of this disclosure.

FIG. 4 is a block diagram illustrating an example set of devices that may exchange messages including 3D media data according to techniques of this disclosure. In this example, FIG. 4 depicts user equipment (UE) device 120 and UE 122, as well as Multimedia Messaging Server (MMS) 124. MMS 124 and UE 122 are communicatively coupled via radio access network (RAN) 130, in this example. MMS 124 may correspond to an edge computing server.

Initially (e.g., when UE 122 becomes communicatively coupled to RAN 130), UE 122 may send rendering capabilities data (that is, data representing the capabilities of UE

122 to render various types of data, such as image and video data, as well as 3D media data) to MMS 124. In this example, it is assumed that UE 122 is not capable of rendering 3D media data. Therefore, UE 122 may send data to MMS 124 indicating that UE 122 is not capable of rendering 3D media data, but is capable of rendering image data.

At some point, UE 120 and UE 122 may initiate a messaging session, such as a multimedia messaging service (MMS) session. UE 120 may send a message including 3D media data (also referred to herein as 3D object data) to UE 122. MMS 124 may receive this message and determine that the message is destined for UE 122. MMS 124 may determine that the message includes 3D media data. Based on the rendering capabilities data received from UE 122, MMS 124 may extract the 3D media data and render (i.e., transcode) the 3D media data on behalf of UE 122 to image data, then send the 3D media data to UE 122. For example, MMS 124 may update the message received from UE 120 to include the rendered image data instead of the 3D media data. In this manner, UE 122 may be capable of participating in an MMS session including the exchange of 3D media data with UE 120 despite not being capable of locally rendering such 3D media data.

Figure 5:
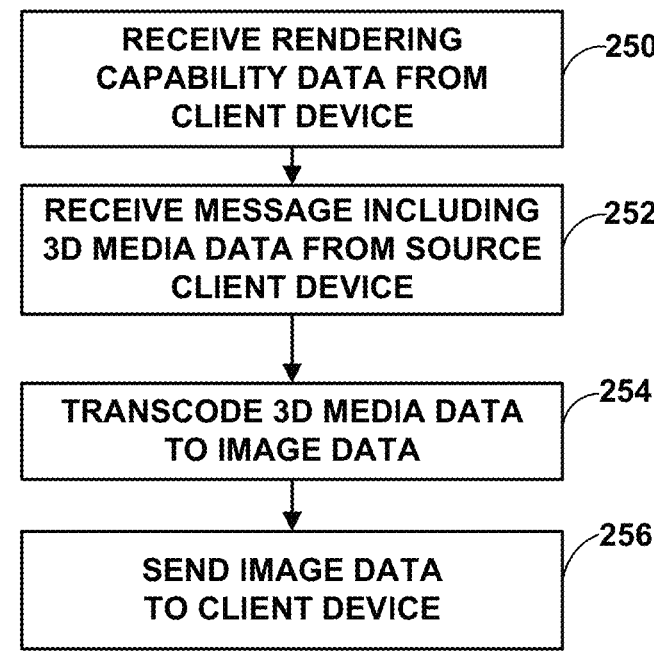
FIG. 5 is a flowchart illustrating an example process of sending transcoded image data to a client device according to techniques of this disclosure.

FIG. 5 is a flowchart illustrating an example process of sending transcoded image data to a client device according to techniques of this disclosure. The method of FIG. 5 may be performed by a server device (e.g., a Multimedia Messaging Server (MMS) device), such as server device 60 of FIG. 1 or MMS 124 of FIG. 4. For purposes of explanation and example, the method of FIG. 5 is explained with respect to MMS 124 of FIG. 4.

Initially, MMS 124 receives rendering capability data from a client device (250). The rendering capability data may indicate that the client device is not capable of rendering 3D media data. MMS 124 may then receive a message (e.g., an MMBP message or MMS message) including 3D media data and destined for the client device (252). Based on the rendering capabilities data for the client device, MMS 124 may determine that the client device is not capable of rendering the 3D media data. Thus, MMS 124 may transcode (e.g., render) the 3D media data to image data (e.g., one or more images, such as single image or image sequence) (254), then send the image data to the client device (256).

In this manner, the method of FIG. 5 represents an example of a method of sending media data including: receiving, by a server device, a set of three-dimensional (3D) media data being sent to a client device; transcoding, by the server device, the set of 3D media data to a set of one or more images; and sending, by the server device, the set of one or more images to the client device.

The following clauses represent various examples of the techniques of this disclosure:

Clause 1. A method of sending media data, the method comprising: receiving, by a server device, a set of three-dimensional (3D) media data being sent to a client device; transcoding, by the server device, the set of 3D media data to a set of one or more images; and sending, by the server device, the set of one or more images to the client device.

Clause 2. The method of clause 1, further comprising determining that the client device is not capable of rendering the set of 3D media data.

Clause 3. The method of clause 2, wherein determining that the client device is not capable of rendering the set of 3D media data comprises receiving data representing capabilities of the client device.

Clause 4. The method of any of clauses 1-3, wherein the client device comprises a first client device, wherein receiving the set of 3D media data comprises receiving the set of 3D media data from a second client device.

Clause 5. The method of any of clauses 1-4, wherein receiving the set of 3D media data comprises receiving a Multimedia Message Service (MMS) message.

Clause 6. The method of clause 5, wherein the MMS message is formatted as a multi-part MIME message.

Clause 7. The method of any of clauses 5 and 6, wherein the MMS message includes a GL Transmission Format (glTF) or a GL transmission Format Binary (glB) file including the 3D media content.

Clause 8. The method of any of clauses 1-7, further comprising receiving data indicating a recommended camera path along which to render the one or more images.

Clause 9. The method of clause 8, wherein the recommended camera path includes an initial pose and a set of additional pose and time sample pairs, where each of the additional pose and time sample pairs provides a pose for a virtual camera and a time offset at which to activate the pose.

Clause 10. The method of clause 8, wherein the recommended camera path includes an initial pose and a description of the recommended camera path including a shape of each segment of the recommended camera path and a velocity of camera movement along the segment.

Clause 11. The method of any of clauses 1-10, wherein transcoding the 3D media data comprises forming a High Efficiency Image File (HEIF) encoded image sequence including the set of one or more images.

Clause 12. The method of any of clauses 1-11, wherein transcoding the 3D media data comprises rendering the set of one or more images to include an alpha channel corresponding to portions of the images around one or more 3D objects of the 3D media data.

Clause 13. The method of clause 1, further comprising determining that the client device is not capable of rendering the set of 3D media data.

Clause 14. The method of clause 13, wherein determining that the client device is not capable of rendering the set of 3D media data comprises receiving data representing capabilities of the client device.

Clause 15. The method of clause 1, wherein the client device comprises a first client device, wherein receiving the set of 3D media data comprises receiving the set of 3D media data from a second client device.

Clause 16. The method of clause 1, wherein receiving the set of 3D media data comprises receiving a Multimedia Message Service (MMS) message.

Clause 17. The method of clause 16, wherein the MMS message is formatted as a multi-part MIME message.

Clause 18. The method of clause 16, wherein the MMS message includes a GL Transmission Format (glTF) or a GL transmission Format Binary (glB) file including the 3D media content.

Clause 19. The method of clause 1, further comprising receiving data indicating a recommended camera path along which to render the one or more images.

Clause 20. The method of clause 19, wherein the recommended camera path includes an initial pose and a set of additional pose and time sample pairs, where each of the additional pose and time sample pairs provides a pose for a virtual camera and a time offset at which to activate the pose.

Clause 21. The method of clause 19, wherein the recommended camera path includes an initial pose and a description of the recommended camera path including a shape of each segment of the recommended camera path and a velocity of camera movement along the segment.

Clause 22. The method of clause 1, wherein transcoding the 3D media data comprises forming a High Efficiency Image File (HEIF) encoded image sequence including the set of one or more images.

Clause 23. The method of clause 1, wherein transcoding the 3D media data comprises rendering the set of one or more images to include an alpha channel corresponding to portions of the images around one or more 3D objects of the 3D media data.

Clause 24. A device for retrieving media data, the device comprising one or more means for performing the method of any of clauses 1-23.

Clause 25. The device of clause 24, wherein the one or more means comprise a processing system including one or more processors implemented in circuitry.

Clause 26. The device of clause 24, wherein the apparatus comprises at least one of: an integrated circuit; a microprocessor; and a wireless communication device.

Clause 27. A computer-readable storage medium having stored thereon instructions that, when executed, cause a processor to perform the method of any of clauses 1-23.

Clause 28. A device for sending media data, the device comprising: means for receiving a set of three-dimensional (3D) media data being sent to a client device; means for transcoding the set of 3D media data to a set of one or more images; and means for sending the set of one or more images to the client device.

Clause 29. A method of sending media data, the method comprising: receiving, by a server device, a set of three-dimensional (3D) media data being sent to a client device; transcoding, by the server device, the set of 3D media data to a set of one or more images; and sending, by the server device, the set of one or more images to the client device.

Clause 30. The method of clause 29, further comprising determining that the client device is not capable of rendering the set of 3D media data.

Clause 31. The method of clause 30, wherein determining that the client device is not capable of rendering the set of 3D media data comprises receiving data from the client device representing rendering capabilities of the client device.

Clause 32. The method of clause 29, wherein the client device comprises a first client device, and wherein receiving the set of 3D media data comprises receiving the set of 3D media data from a second client device as a message from the second client device to the first client device.

Clause 33. The method of clause 32, wherein the message includes one or more multimedia messaging body parts (MMBPs), at least one of the MMBPs including the 3D media data.

Clause 34. The method of clause 32, wherein receiving the set of 3D media data as a message comprises receiving a Multimedia Message Service (MMS) message.

Clause 35. The method of clause 34, wherein the MMS message is formatted as a multi-part MIME message.

Clause 36. The method of clause 34, wherein the MMS message includes a GL Transmission Format (glTF) or a GL transmission Format Binary (glB) file including the 3D media data.

Clause 37. The method of clause 29, further comprising receiving data indicating a recommended camera path along which to render the one or more images.

Clause 38. The method of clause 37, wherein the recommended camera path includes an initial pose and a set of additional pose and time sample pairs, where each of the additional pose and time sample pairs provides a pose for a virtual camera and a time offset at which to activate the pose.

Clause 39. The method of clause 37, wherein the recommended camera path includes an initial pose and a description of the recommended camera path including a shape of each segment of the recommended camera path and a velocity of camera movement along the segment.

Clause 40. The method of clause 29, wherein transcoding the 3D media data comprises forming a High Efficiency Image File (HEIF) encoded image sequence including the set of one or more images.

Clause 41. The method of clause 29, wherein transcoding the 3D media data comprises rendering the set of one or more images to include an alpha channel corresponding to portions of the images around one or more 3D objects of the 3D media data.

Clause 42. A server device for sending media data, the server device comprising: a memory configured to store media data; and a processing system implemented in circuitry and configured to: receive a set of three-dimensional (3D) media data being sent to a client device; transcode the set of 3D media data to a set of one or more images; and send the set of one or more images to the client device.

Clause 43. The server device of clause 42, wherein the processing system is further configured to receive data from the client device representing rendering capabilities of the client device and indicating that the client device is not capable of rendering the set of 3D media data.

Clause 44. The server device of clause 42, wherein the client device comprises a first client device, and wherein to receive the set of 3D media data, the processing system is configured to receive the set of 3D media data from a second client device as a message from the second client device to the first client device.

Clause 45. The server device of clause 44, wherein the message includes one or more multimedia messaging body parts (MMBPs), at least one of the MMBPs including the 3D media data.

Clause 46. The server device of clause 44, wherein the message comprises a Multimedia Message Service (MMS) message, the MMS message including a GL Transmission Format (glTF) or a GL transmission Format Binary (glB) file including the 3D media data.

Clause 47. The server device of clause 42, wherein the processing system is further configured to receive data indicating a recommended camera path along which to render the one or more images.

Clause 48. A server device for sending media data, the device comprising: means for receiving a set of three-dimensional (3D) media data being sent to a client device; means for transcoding the set of 3D media data to a set of one or more images; and means for sending the set of one or more images to the client device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of sending media data, the method comprising:

receiving, by a server device, a set of three-dimensional (3D) media data being sent to a client device;

transcoding, by the server device, the set of 3D media data to a set of one or more images;

sending, by the server device, the set of one or more images to the client device; and receiving data indicative of a camera path along which to render the set of one or more images, the camera path including an initial pose associated with a virtual camera.

2. The method of claim 1, further comprising determining that the client device is not capable of rendering the set of 3D media data.

3. The method of claim 2, wherein determining that the client device is not capable of rendering the set of 3D media data comprises receiving data from the client device representing rendering capabilities of the client device.

4. The method of claim 1, wherein the client device comprises a first client device, and wherein receiving the set of 3D media data comprises receiving the set of 3D media data from a second client device as a message from the second client device to the first client device.

5. The method of claim 4, wherein the message includes one or more multimedia messaging body parts (MMBPs), at least one of the MMBPs including the 3D media data.

6. The method of claim 4, wherein receiving the set of 3D media data as a message comprises receiving a Multimedia Message Service (MMS) message.

7. The method of claim 6, wherein the MMS message is formatted as a multi-part Multipurpose Internet Mail Extensions (MIME) message.

8. The method of claim 6, wherein the MMS message includes a Graphics Library Transmission Format (glTF) or a Graphics Library Transmission Format Binary (glB) file including the 3D media data.

9. The method of claim 1, wherein the camera path further includes a set of pose and time sample pairs, where each pair among the set of pose and time sample pairs provides a pose for the virtual camera and a time offset at which to activate the pose.

10. The method of claim 1, wherein the camera path further includes a description of the camera path including a shape of each segment of the camera path and a velocity of camera movement along each segment.

11. The method of claim 1, wherein transcoding the 3D media data comprises forming a High Efficiency Image File (HEIF) encoded image sequence including the set of one or more images.

12. The method of claim 1, wherein transcoding the 3D media data comprises rendering the set of one or more images to include an alpha channel corresponding to portions of images around one or more 3D objects of the 3D media data.

13. A server device for sending media data, the server device comprising:

a memory configured to store the media data; and a processing system implemented in circuitry and configured to:

receive a set of three-dimensional (3D) media data being sent to a client device;

transcode the set of 3D media data to a set of one or more images;

send the set of one or more images to the client device; and receive data indicative of a camera path along which to render the set of one or more images, the camera path including an initial pose associated with a virtual camera.

14. The server device of claim 13, wherein the processing system is further configured to receive data, from the client device, representing rendering capabilities of the client device and indicating that the client device is not capable of rendering the set of 3D media data.

15. The server device of claim 13, wherein the client device comprises a first client device, and wherein to receive the set of 3D media data, the processing system is configured to receive the set of 3D media data from a second client device as a message from the second client device to the first client device.

16. The server device of claim 15, wherein the message includes one or more multimedia messaging body parts (MMBPs), at least one of the MMBPs including the 3D media data.

17. The server device of claim 15, wherein the message comprises a Multimedia Message Service (MMS) message, the MMS message including a Graphics Library Transmission Format (glTF) or a Graphics Library Transmission Format Binary (glB) file including the 3D media data.

\* \* \* \* \*